2,976,205

PREPARATION OF WEBS AND SHEETS FROM CELLULOSE ESTERS

Charles D. Snead and Ralph W. Peters, Rochester, N.Y., assignors to Eastman Kodak Company, Rochester, N.Y., a corporation of New Jersey No Drawing. Filed Sept. 9, 1955, Ser. No. 533,526

7 Claims. (Cl. 162—157)

This application relates to the preparation of cellulose ester webs and to the preparation of molded products or transparent sheeting therefrom.

Ordinarily the methods which have been employed for the manufacture of cellulose ester transparent sheeting have been either (1) the melting of the cellulose ester and casting or extruding it into sheet form, (2) the casting of a film of a cellulose ester from its solution in a volatile solvent followed by the volatilization of the solvent therefrom with heat and/or air, or (3) the casting of a sheet of the cellulose ester from its solution in a solvent followed by the removal of the solvent from the sheet by immersion such as in a liquid extracting bath. All of these methods involve a casting of the cellulose ester material while in liquid form and may involve the use of a solvent in that operation. It is well known that there are various objectionable features in the making of cellulose ester sheeting by the methods listed. For instance, the use of solvents involves hazard due to fire and the use of solvent recovery equipment. Also in those processes the rate at which the sheet is formed in the carrying out of the operation is limited.

One object of our invention is to provide a method of preparing sheets or webs of cellulose ester material. Another object of our invention is to provide a method of preparing cellulose ester sheeting in which the use of solvents is eliminated. A further object of our invention is to provide a method of preparing cellulose ester sheeting in which high rates of production may be employed. Other objects of our invention will appear herein.

We have found that cellulose esters in the form of a fibrous flocculated precipitate may be dispersed in water and that dispersion laid down upon a foraminous support such as on the wire of a Fourdrinier paper-making machine to form a web of the cellulose ester which is of value for the preparation of cellulose ester sheeting therefrom. The cellulose ester sheeting may be prepared therefrom by subjecting the so-prepared paper-like or paper-board-like material to heat and pressure preferably while mixed with plasticizer. The plasticizer may be incorporated in the cellulose ester material such as in the form of an emulsion in the procedure employed for preparing the web of the cellulose ester. However, it may be incorporated in other ways such as by the immersion of the cellulose ester web in plasticizer-containing liquid or by spraying plasticizer or a solution thereof onto the cellulose ester web.

Cellulose esters are customarily recovered from their esterification masses in the form of fibrous flocculated precipitates. These precipitates are adapted to be employed as the starting material in accordance with our invention. The cellulose ester may be a lower fatty ester of cellulose such as cellulose acetate, cellulose acetate butyrate, cellulose acetate propionate, or cellulose butyrate, either hydrolyzed or fully esterified. The cellulose ester may be modified such as by mixing therewith pigments, dyes, or even other fibers such as spun fibers or glass fibers. The fibrous flocculated cellulose ester employed as the starting material in accordance with our invention may have had a content of plasticizer imparted thereto or the plasticizer may be added thereto at some later point.

The material described herein may be marketed in one of several forms such as:

(1) A papered-out sheet of cellulose ester adapted for subsequent pressing, molding or forming.

(2) A semi-finished sheet (partially pressed) adapted for subsequent molding or forming such as for printing, embossing, laminating to other materials, lampshades, rigid containers etc.

(3) A finished sheet (fully pressed or transparentized) suitable for various uses including subsequent forming operations.

In accordance with our invention, the cellulose ester web may be conveniently prepared on a Fourdrinier paper machine from an aqueous dispersion of fibrous flocculated cellulose ester. The dispersion may be formed by introducing fibrous flocculated cellulose ester into water preferably containing a dispersing agent, accompanied by agitation. The cellulose ester employed may be obtained from any step in the manufacture of cellulose esters which will permit of precipitation of the cellulose ester in fibrous flocculated form. In this way, the length, diameter, and strength of the fibers obtained may be varied. The cellulose ester precipitate may be employed directly in the web-forming operation without any necessity of drying first. Cellulose esters in very desirable form are ordinarily obtained by precipitating the cellulose ester from the spent cellulose esterification mass under such conditions that the solvents therein are not diluted to too great an extent.

The formation of the web of the cellulose ester fibers ordinarily is carried out by suspending a precipitated cellulose ester in water and diluting to a low consistency such as within the range of .05–5%, a consistency on the order of .5–1% being quite convenient. The sheet or web may then be formed in the conventional manner on the wire of a paper-making machine. The web is preferably pressed to strengthen and compact it. It is then dried by the use of a moderately elevated temperature such as in an oven or on a drying drum. The sheets thus obtained may be marketed as such for use by others in preparing transparent cellulose ester sheeting or they may be used directly in the preparation of such sheeting. Formed papier-mache-like products or finished transparent sheeting may be prepared from this material by subjecting it to elevated temperatures and pressures. Formed products may be obtained by subjecting the web to a temperature and pressure sufficient to fuse the material while the desired shape is imparted such as in a mold. Temperatures within the range of 250–400° F. are ordinarily most convenient in this operation. Aids to plasticity such as plasticizer in the form of its solution in a volatile solvent, or solvents themselves may be employed, the latter particularly in finishing operations.

The following examples illustrate our invention but are not to be considered as limiting thereof:

Example 1

100 parts of a fibrous flocculated cellulose acetate precipitate was dispersed in water containing 20 parts of a dispersing agent, in this case glycol stearate. The slurry or dispersion thus formed was diluted with water to a consistency of 1% and the dispersion was then coated out onto a foraminous belt and suction was applied whereby a pulp sheet was formed. The sheet thus formed was passed through felted presses to increase the solids content to 15–25%. The sheet was dried under pressure on a heated drum. The resulting cellulose ester web or sheet was heat pressed to transparency at a temperature of 400° F. and a pressure of 20-35 ton ream gauge. Pressures within the range of 6,250-11,000 pounds per square inch were employed. A transparent cellulose ester sheet was obtained similar to one prepared by a commercial process using a cellulose ester solution.

*Example 2*

100 parts of a cellulose acetate precipitate dispersed in water at 15% consistency was mixed with 51 parts of dimethyl phthalate in emulsified form and stood for one-half hour to obtain incorporation of the plasticizer by selective absorption into the cellulose ester. The slurry thus obtained was diluted with water to approximately 1% consistency and was used to form sheets or webs. The so-formed sheets after removal from a foraminous belt were felt pressed to increase the solid content to 20-25%. The web was dried as described in the preceding example. The sheets thus obtained were pressed to transparency using a temperature of 370° F. and a 20-35 ton ream gauge pressure (6,250-11,000 pounds per square inch). The sheets obtained were useful for molding in any conventional manner or attenuating to produce a sheet having transparency. Without heat pressing the sheet is obtained in opaque form (such as by the use of heat alone).

The plasticizer which is employed is emulsified such as by mixing 200 parts of the plasticizer with 3 parts of oleic acid, 200 parts of water and 3 parts of ammonium hydroxide. The plasticizer emulsion is ordinarily contacted with the cellulose ester for 15-90 minutes before web formation during which time the plasticizer is selectively absorbed by the cellulose ester.

The sheet obtained by the above procedure is useful for preparing transparent sheeting or for forming into desired shapes.

*Example 3*

4 parts of butyl diphenyl phosphate (Santicizer 141) and 80 parts of dimethyl phthalate were emulsified with a wetting agent in water and the emulsion was added to a slurry of 100 parts of cellulose acetate precipitate (20% in water) and permitted to stand for one hour. The slurry was diluted to 0.05% consistency and was flowed out onto a wire to form a sheet which was pressed and dried by passing over a drying drum. The sheet thus obtained was submitted to heat and pressure. It was found to have good flexibilities and was susceptible to shaping. The cellulose ester employed in the examples had a viscosity of 9-17 seconds and average acetyl content of 38.5%.

Our invention includes the use of any of the common and well-known plasticizers for the particular cellulose esters used. A convenient method for applying the plasticizer to the cellulose ester material is to form an emulsion of the plasticizer and add to the slurry of the cellulose ester from which the sheet is formed. A typical formula for preparing such an emulsion and one which has been found to be useful for preparing these emulsions is:

| Parts by weight | Parts by weight |
|---|---|
| Plasticizer _____ 200 | Water _____ 200 |
| Oleic acid _____ 3 | Ammonium hydroxide _ 3 |

The plasticizer and oleic acid are mixed together and added very slowly to a violently agitated mixture of the water and ammonium hydroxide solution until emulsification is obtained. Another convenient method of preparing an emulsion is to use 200 parts of plasticizer, 200 parts of water, 3 parts of ammonium hydroxide, and 5 parts of a 40% solution of an alkyl aryl polyether alcohol (Triton X400). In use, the emulsion is permitted to contact the cellulose ester for a short time such as 15 to 90 minutes prior to the sheet formation, the mixture of water and plasticizer being added so that there is from 1-30% of plasticizer based on the cellulose ester suspended in the mass.

We claim:

1. A method of making sheets which may be adapted to be formed into desired products which comprises forming a suspension in water of a fibrous flocculated precipitate of a lower fatty acid ester of cellulose, laying down the cellulose ester suspension onto a foraminous surface to form a sheet of the cellulose ester and drying the so-formed sheet.

2. A method of making colloidized cellulose ester sheeting which comprises forming a suspension in water of a fibrous flocculated precipitate of a lower fatty acid ester of cellulose, laying down the suspension onto a foraminous surface to form a sheet thereof and subsequently subjecting the product to sufficient heat and pressure to fuse the mass into a homogeneous sheet.

3. A method of preparing cellulose ester products adapted to be formed by means of heat and pressure which comprises forming a suspension in water of a fibrous flocculated precipitate of a lower fatty acid ester of cellulose, adding to the suspension an emulsion of a plasticizer, laying down the suspension onto a foraminous surface to form a cellulose ester sheet and drying the sheet.

4. A method of preparing a sheet adapted to be formed into products by heat and pressure which comprises forming an aqueous suspension of a fibrous flocculated precipitate of cellulose acetate, diluting to a consistency of .05-5%, laying down the suspension thus formed onto the wire of a paper machine and drying the thus formed product.

5. A method of preparing a sheet adapted to be formed into products by heat and pressure which comprises forming an aqueous suspension of a fibrous flocculated precipitate of cellulose acetate butyrate, diluting to a consistency of .05-5%, laying down the suspension thus formed onto the wire of a paper machine and drying the thus formed product.

6. A method of preparing a sheet adapted to be formed into products by heat and pressure which comprises forming an aqueous suspension of a fibrous flocculated precipitate of cellulose acetate, adding to the suspension an aqueous emulsion of a plasticizer, laying down the suspension thus formed onto the wire of a paper machine and drying the thus formed product whereby a cellulose acetate papered-out sheet containing an appreciable content of plasticizer is obtained.

7. A method of making a colloidized cellulose acetate sheet which comprises forming an aqueous suspension of a fibrous flocculated precipitate of cellulose acetate having a consistency of .05-5%, adding to the suspension an aqueous emulsion of the plasticizer, laying down the suspension thus formed onto the wire of a paper machine to form a sheet thereof and subsequently subjected the product to sufficient heat and pressure to fuse the mass into a homogeneous sheet.

References Cited in the file of this patent

UNITED STATES PATENTS

| | | |
|---|---|---|
| 1,960,551 | Richter _____ | May 29, 1934 |
| 1,992,958 | Malm et al. _____ | Mar. 5, 1935 |
| 2,076,181 | Hopkinson et al. _____ | Apr. 6, 1937 |
| 2,324,838 | Harz et al. _____ | July 20, 1943 |
| 2,357,962 | Leemann et al. _____ | Sept. 12, 1944 |
| 2,489,382 | Martin et al. _____ | Nov. 29, 1949 |
| 2,563,708 | Crane _____ | Aug. 7, 1951 |
| 2,591,077 | Lamborn _____ | Apr. 1, 1952 |
| 2,601,598 | Daniels et al. _____ | June 24, 1952 |
| 2,626,214 | Osborne _____ | Jan. 20, 1953 |
| 2,765,228 | Jordan _____ | Oct. 2, 1956 |
| 2,772,267 | Malm et al. _____ | Nov. 27, 1956 |
| 2,789,903 | Lukman et al. _____ | Apr. 23, 1957 |